United States Patent
Lyu (10) Patent No.: US 9,520,158 B1
(45) Date of Patent: Dec. 13, 2016

(54) FASTENING DEVICE

(71) Applicant: COOLER MASTER TECHNOLOGY INC., New Taipei (TW)

(72) Inventor: Yu-Qing Lyu, New Taipei (TW)

(73) Assignee: COOLER MASTER TECHNOLOGY INC., New Taipei (TW)

( * ) Notice: Subject to any disclaimer, the term of this patent is extended or adjusted under 35 U.S.C. 154(b) by 0 days.

(21) Appl. No.: 14/820,334

(22) Filed: Aug. 6, 2015

(30) Foreign Application Priority Data

Jun. 23, 2015 (TW) .............................. 104210061 U (51) Int. Cl.
*G11B 33/08* (2006.01)
*G11B 33/12* (2006.01)
*G06F 1/18* (2006.01)

(52) U.S. Cl.
CPC ............... *G11B 33/08* (2013.01); *G06F 1/187* (2013.01); *G11B 33/123* (2013.01); *G11B 33/124* (2013.01); *G11B 33/128* (2013.01)

(58) Field of Classification Search
CPC ...... G06F 1/187; G11B 33/123; G11B 33/124; G11B 33/08; G11B 33/128
See application file for complete search history.

(56) References Cited

U.S. PATENT DOCUMENTS

| | | | | |
|---|---|---|---|---|
| 5,035,396 A * | 7/1991 | Krum | ..................... | G11B 33/08 248/635 |
| 5,721,457 A * | 2/1998 | Sri-Jayantha | .......... | G11B 19/04 307/119 |
| 6,000,654 A * | 12/1999 | Hirabayashi | ......... | G11B 33/124 242/338.4 |
| 6,683,840 B2 * | 1/2004 | Shin | ....................... | G11B 33/08 720/698 |
| 6,762,932 B2 * | 7/2004 | Regimbal | ............... | G06F 1/184 361/679.33 |
| 7,126,817 B2 * | 10/2006 | Li | ........................... | G06F 1/184 312/223.2 |
| 7,137,767 B2 * | 11/2006 | Franke | .................. | F16F 1/3732 248/224.8 |
| 7,248,468 B1 * | 7/2007 | Hsu | ......................... | G06F 1/181 174/544 |
| 7,576,978 B2 * | 8/2009 | Fan | ......................... | G06F 1/183 361/679.33 |
| 7,656,657 B2 * | 2/2010 | Grady | ..................... | G06F 1/187 361/679.37 |

(Continued)

*Primary Examiner* — Eret McNichols
(74) *Attorney, Agent, or Firm* — Chun-Ming Shih; HDLS IPR Services (57) ABSTRACT

A fastening device for securing and protecting an electronic device is provided. The electronic device is provided with at least one assembly hole. The fastening device includes a fastening assembly and a plate. The fastening assembly includes a buffer and a fastening element inserted through the buffer. The fastening element includes a rod portion, a fastening portion at one end of the rod portion, and a head portion at the other end of the rod portion. The fastening portion is fastened in the assembly hole. The plate includes a first positioning hole and a second positioning hole communicating with the first positioning hole. A diameter of the first positioning hole is greater than a diameter of the second positioning hole, and a diameter of the head portion is less than the diameter of the first positioning hole and greater than the diameter of the second positioning hole.

14 Claims, 10 Drawing Sheets

(56) References Cited

U.S. PATENT DOCUMENTS

| | | | | |
|---|---|---|---|---|
| 7,839,639 B2* | 11/2010 | Najbert | ............... | F04D 29/601 361/679.36 |
| 7,911,777 B2* | 3/2011 | Fan | ............... | G06F 1/187 312/223.1 |
| 8,085,552 B2* | 12/2011 | Takao | ............... | G06F 1/185 361/807 |
| 8,665,588 B2* | 3/2014 | Sun | ............... | G06F 1/187 211/26 |
| 8,724,310 B2* | 5/2014 | Easton | ............... | G06F 1/187 312/223.1 |
| 8,767,386 B2* | 7/2014 | Sun | ............... | G06F 1/187 165/104.33 |
| 8,824,133 B2* | 9/2014 | Ko | ............... | G06F 1/1658 361/679.39 |
| 8,908,327 B1* | 12/2014 | Li | ............... | G11B 33/124 360/99.17 |
| 9,165,608 B2* | 10/2015 | Tsai | ............... | G11B 33/124 |
| 9,207,709 B2* | 12/2015 | Xie | ............... | G06F 1/16 |
| 9,251,858 B2* | 2/2016 | Lo | ............... | G06F 1/187 |
| 2002/0051338 A1* | 5/2002 | Jiang | ............... | G06F 1/20 361/679.36 |
| 2002/0176350 A1* | 11/2002 | Kadowaki | ............... | F16F 1/3732 720/698 |
| 2004/0113339 A1* | 6/2004 | Masterson | ............... | F16F 1/3732 267/153 |
| 2007/0230106 A1* | 10/2007 | Yeh | ............... | G06F 1/187 361/679.33 |
| 2008/0136298 A1* | 6/2008 | Xiao | ............... | G06F 1/187 312/223.2 |
| 2008/0316698 A1* | 12/2008 | Yeh | ............... | G11B 33/08 361/679.33 |
| 2010/0027231 A1* | 2/2010 | Chang | ............... | F16F 1/3732 361/807 |
| 2010/0290154 A1* | 11/2010 | Kim | ............... | G11B 33/123 360/97.19 |
| 2011/0001280 A1* | 1/2011 | Huang | ............... | F16F 1/3732 267/140.4 |
| 2011/0075348 A1* | 3/2011 | Li | ............... | G11B 33/128 361/679.33 |
| 2011/0194910 A1* | 8/2011 | Lin | ............... | F16B 5/02 411/172 |
| 2012/0087083 A1* | 4/2012 | Yeh | ............... | G06F 1/187 361/679.33 |
| 2013/0039014 A1* | 2/2013 | Chen | ............... | G06F 1/187 361/726 |
| 2013/0048813 A1* | 2/2013 | Liu | ............... | G06F 1/187 248/222.11 |
| 2013/0233987 A1* | 9/2013 | Sun | ............... | G06F 1/187 248/221.11 |
| 2014/0055943 A1* | 2/2014 | Chang | ............... | F16F 1/025 361/679.35 |

\* cited by examiner

FASTENING DEVICE

TECHNICAL FIELD

The present invention relates to a fastening device and, in particular, to a fastening device that enables fast securement and provides shockproof protection.

BACKGROUND

With advancements in the information and computer industries, computers have become indispensable in modern life. In a computer system, a hard disk is a medium for storing and reading data and also serves as a storage device for storing a huge amount of data. The hard disk installed in the computer sometimes undergoes undesirable vibrations, and the problem is even worse with an industry computer, for it may be used in a vibrating environment. The hard disk in the vibrating environment not only has a reduced lifespan but also may malfunction all of sudden.

Furthermore, in a conventional computer system or an electronic device, by increasing the number of the data storage devices (e.g. a hard disk or an optical hard drive), the greater the amount of data can be stored. At present, after fixing the data storage device to a rack, the data storage device can be assembled into the computer system or the electronic device by fixing the rack thereto. The data storage device is fixed to the rack by screw-fastening, in which a bolt needs to be aligned with a threaded hole and then screwed into the threaded hole at two sides of the data storage device, which results in many shortcomings such as inconvenient and time-consuming assembly and disassembly.

Accordingly, the aim of the present invention is to improve the conventional hard disk securement method so as to overcome the above-mentioned shortcomings which are well known in related industries.

SUMMARY

It is an object of the present invention to provide a fastening device for securing and protecting an electronic device, which also enables fast securement and provides shockproof protection.

It is another object of the present invention to provide a fastening device which has a simple structure and facilitates convenient assembly.

Accordingly, the present invention provides a fastening device for securing and protecting an electronic device. The electronic device includes at least one assembly hole. The fastening assembly includes a fastening assembly and a plate. The fastening assembly includes a buffer and a fastening element inserted through the buffer. The fastening element includes a rod portion, a fastening portion at one end of the rod portion, and a head portion at the other end of the rod portion. The fastening portion is fastenable in the assembly hole. The plate includes a first positioning hole and a second positioning hole communicating with the first positioning hole, wherein a diameter of the first positioning hole is greater than a diameter of the second positioning hole, and a diameter of the head portion is less than the diameter of the first positioning hole and greater than the diameter of the second positioning hole, so that the head portion is engaged with the second positioning hole, and the electronic device is secured over the plate.

It is preferable that the buffer further includes two flanges, a recess between the two flanges, and a through hole for insertion of the rod portion. A diameter of the through hole is greater than or equal to a diameter of the rod portion. An outer diameter of each of the flanges is greater than the diameter of the head portion and the diameter of the first positioning hole, so the buffer can contact against the plate corresponding to the first positioning hole and the second positioning hole.

It is preferable that the plate further includes a first surface, a second surface opposite to the first surface, and an extension hole passing through the first surface and the second surface, wherein a first direction is between the first positioning hole and the second positioning hole, a second direction is perpendicular to the first direction, and the extension hole is formed along the first direction and between the first positioning hole and the second positioning hole.

It is preferable that the fastening device further comprises two protruding portions protruding from the second surface, the buffer is in contact against the first surface, the head portion and the two protruding portions are disposed correspondingly, thereby preventing removal of the head portion from the second positioning hole.

BRIEF DESCRIPTION OF THE DRAWINGS

The disclosure will become more fully understood from the detailed description and the drawings given herein below for illustration only, and thus does not limit the disclosure, wherein.

DETAILED DESCRIPTION

Detailed descriptions and technical contents of the present invention are illustrated below in conjunction with the accompany drawings. However, it is to be understood that the descriptions and the accompany drawings disclosed herein are merely illustrative and exemplary and not intended to limit the scope of the present invention.

Referring to FIGS. 1 to 5, the present invention provides a fastening device for securing and protecting an electronic device 10. The electronic device 10 includes at least one assembly hole 20. The electronic device 10 is preferably a data storage device which is, for example, a 3.5-inch hard disk, a 2.5-inch hard disk, a 1.8-inch hard disk, or any other suitable sizes or types of data storage device; however, the electronic device 10 is not limited to the data storage device. In the present embodiment, the types of the electronic device 10 include a hard disk drive (HDD), a hybrid drive (SSHD), and a solid state drive (SSD). However, in other different embodiments, the electronic device 10 can include an optical disk drive or any other hot-swappable storage devices.

In the present invention, the fastening device for securing and protecting the electronic device 10 comprises a fastening assembly 100 and a plate 200. The fastening assembly 100 comprises a buffer 110 and a fastening element 120 inserted through the buffer 110. The buffer 110 comprises two flanges 112 and a recess 114 between the two flanges 112. The fastening element 120 includes a rod portion 124, a fastening portion 122 at one end of the rod portion 124, and a head portion 126 at the other end of the rod portion 124, wherein the fastening portion 122 is fastenable in the assembly hole 20.

As shown in the figures, the electronic device 10 preferably includes four assembly holes 20. In correspondence to the four assembly holes 20, there are provided with four fastening assemblies 100, and four first positioning holes 210 and four second positioning holes 220 of the plate 200, so as to secure the electronic device 10 over the plate 200. However, for ease of illustration, only one assembly hole 20, and one fastening assembly 100, one first positioning hole 210 and one second positioning hole 220 corresponding to this assembly hole 20 are described hereinafter as an example.

Figure 1:
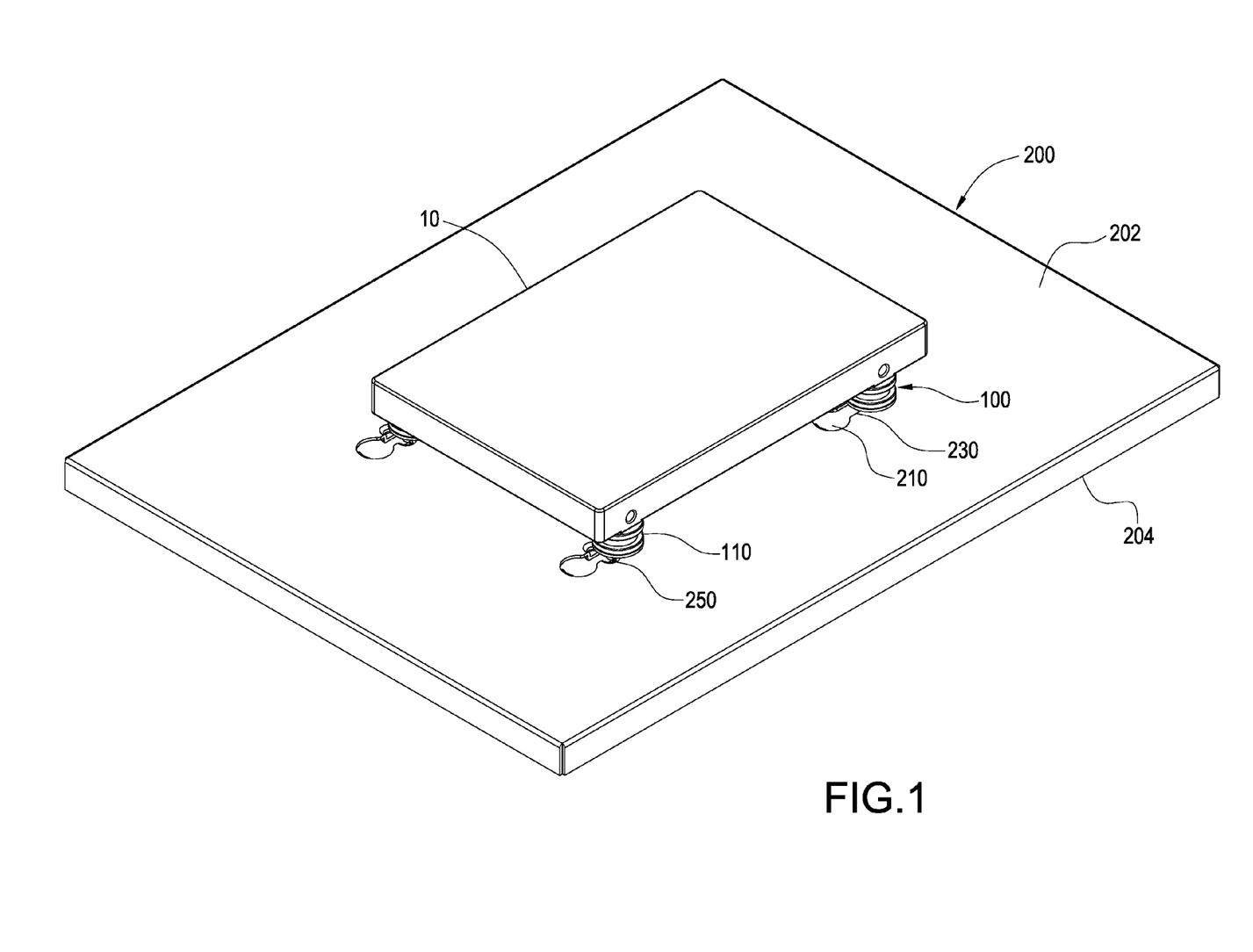
FIG. 1 is a perspective view illustrating a fastening device of the present invention.
Figure 2:
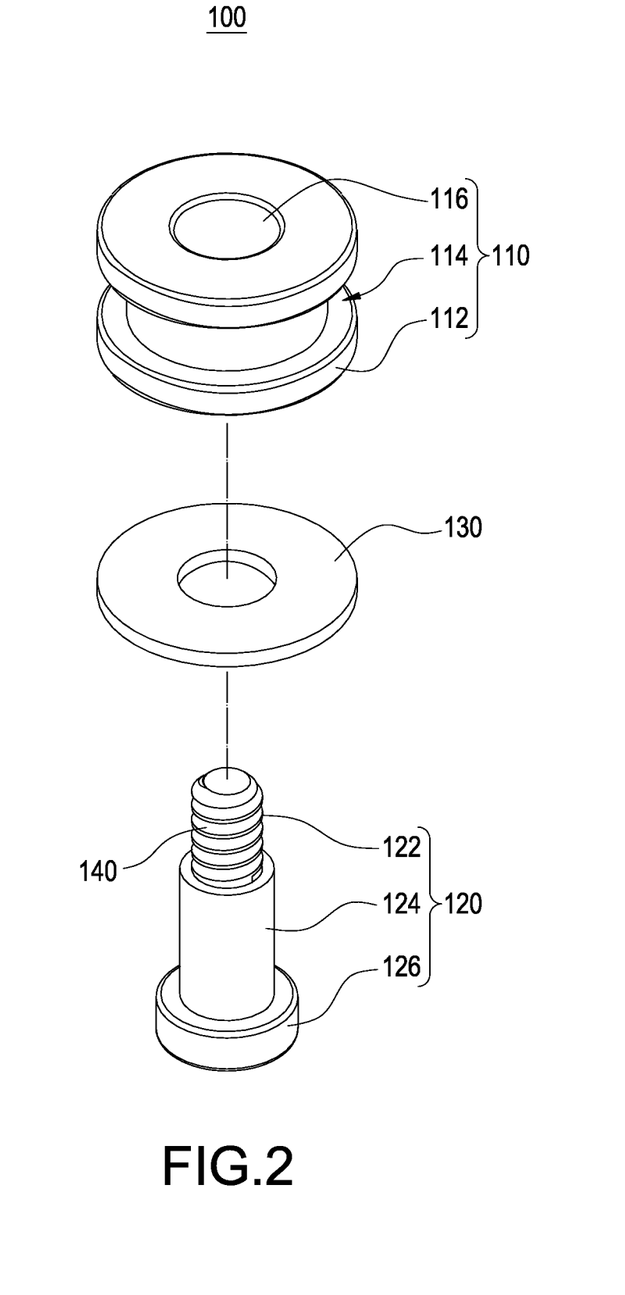
FIG. 2 is an exploded view of the present invention, illustrating a fastening assembly.
Figure 3:
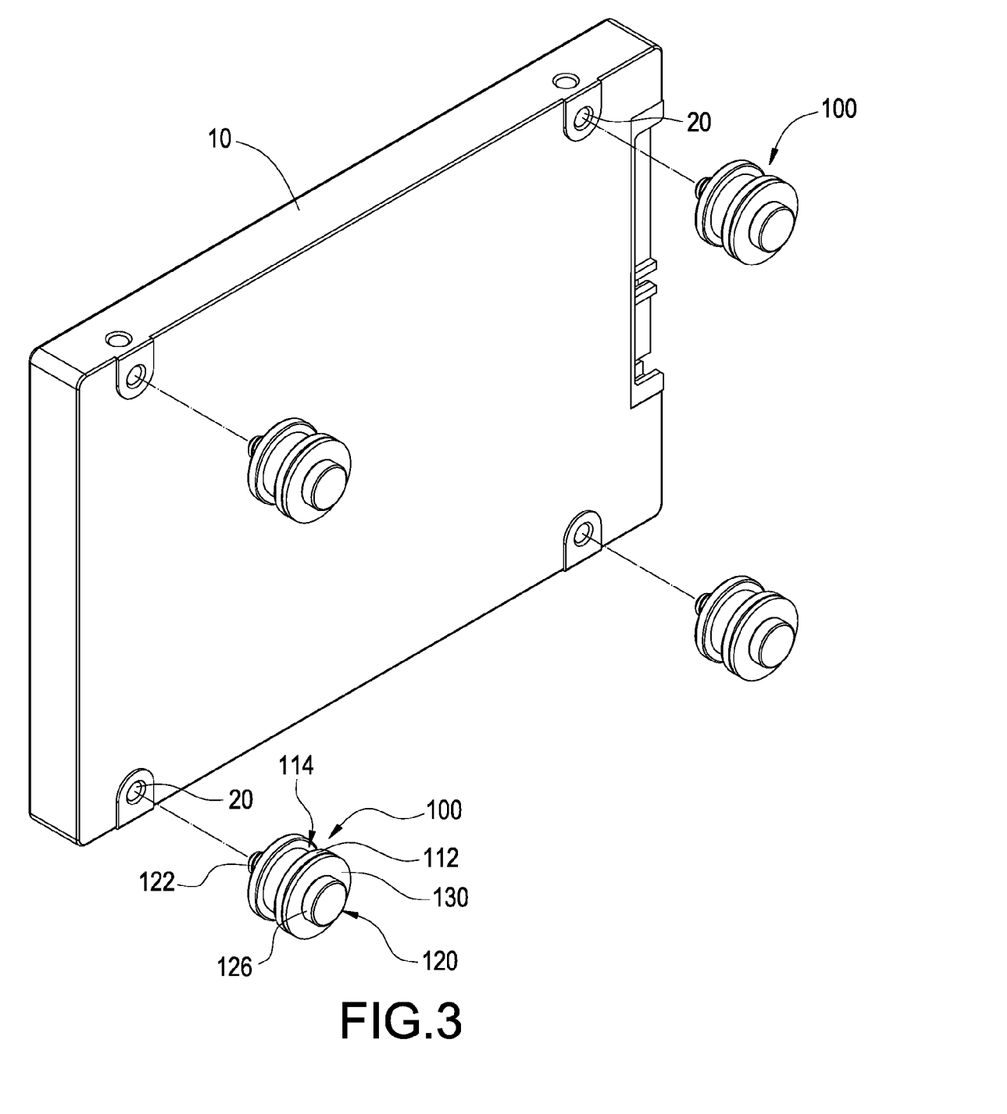
FIG. 3 is an exploded view of the present invention, illustrating the fastening assembly and an electronic device.
Figure 4:
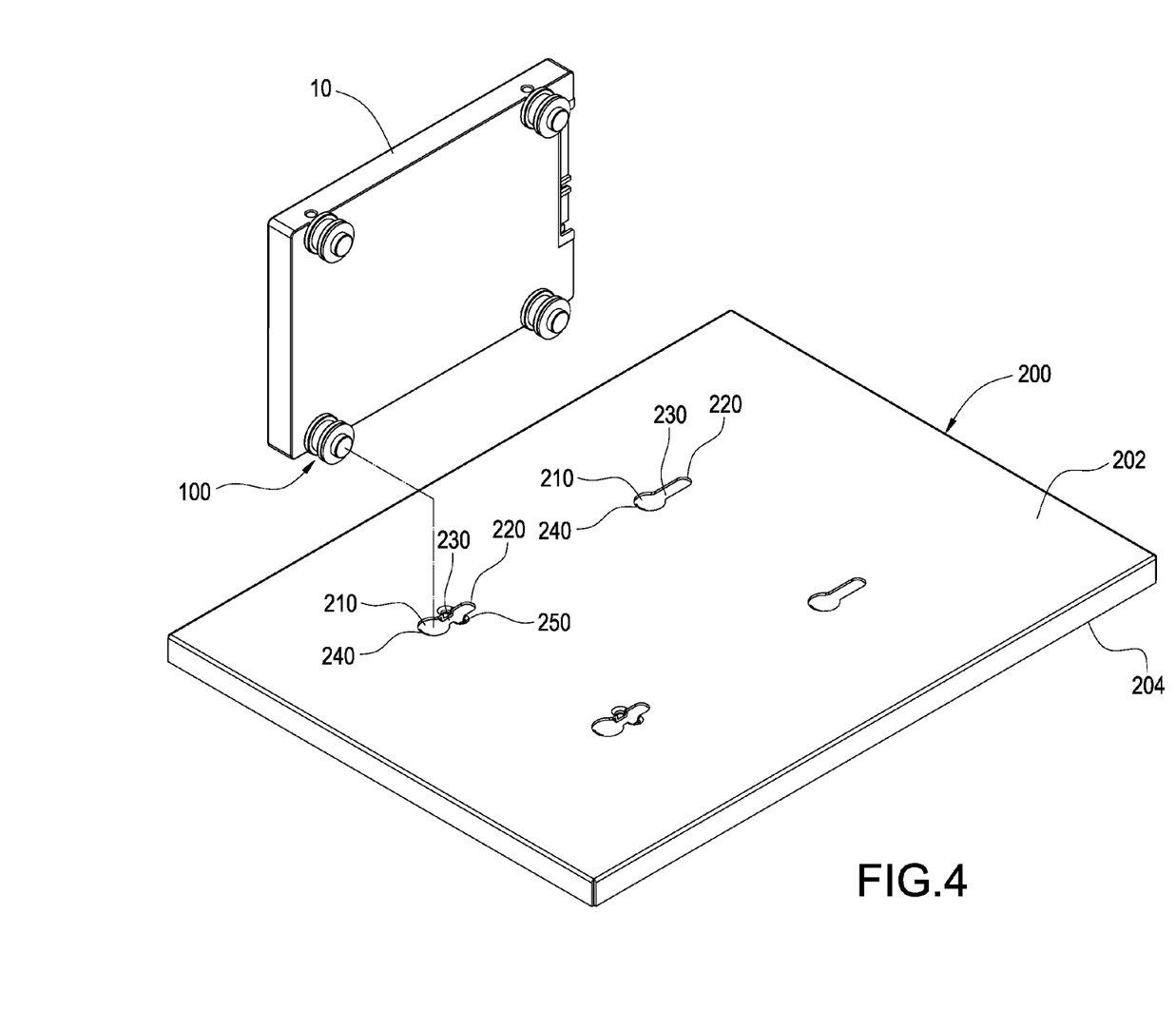
FIG. 4 is a perspective view of the present invention, illustrating the fastening assembly assembled to the electronic device but yet to be assembled to a plate.

In the embodiment shown in FIGS. 2 to 4, the buffer 110 comprises the two flanges 112, the recess 114 between the two flanges 112, and a through hole 116 for insertion of the rod portion 124. A diameter of the through hole 116 is greater than or equal to a diameter of the rod portion 124, so as to facilitate insertion of the rod portion 124 into the through hole 116. An outer diameter of each of the flanges 112 is greater than a diameter of the head portion 126 and a diameter of the first positioning hole 210, so the buffer 110 can contact against the plate 200 corresponding to the first positioning hole 210 and the second positioning hole 220.

Furthermore, the fastening device comprises a pad 130 made of a metal material. The pad 130 is disposed between the buffer 110 and the head portion 126, thereby preventing the buffer 110 from directly rubbing against a surface of the plate 200, prolonging the lifespan of the buffer 110, and enabling the fastening assembly 100 to be movably assembled to the plate 200 with ease. It is preferable that the buffer 110 is made of rubber or silicon, or consists of a spring or other suitable soft or flexible materials.

In FIG. 2, the fastening element 120 is preferably a bolt, the fastening portion 122 is an externally threaded portion 140 for fastening in the internally threaded assembly hole 20. However, in other different embodiments, the fastening element 120 can be a positioning pillar, a dowel, a pin, or other suitable elements, and the fastening portion 122 can also be a plug for interference fit with the assembly hole 20.

Referring to FIGS. 5 to 9, the plate 200 forms a first positioning hole 210, a second positioning hole 220 communicating with the first positioning hole 210, wherein a first direction F is between the first positioning hole 210 and the second positioning hole 220, a second direction S is perpendicular to the first direction F. The diameter of the first positioning hole 210 in the second direction S is greater than a diameter of the second positioning hole 220 in the second direction S. The diameter of the head portion 126 is less than the diameter of the first positioning hole 210 and greater than the diameter of the second positioning hole 220.

Figure 5:
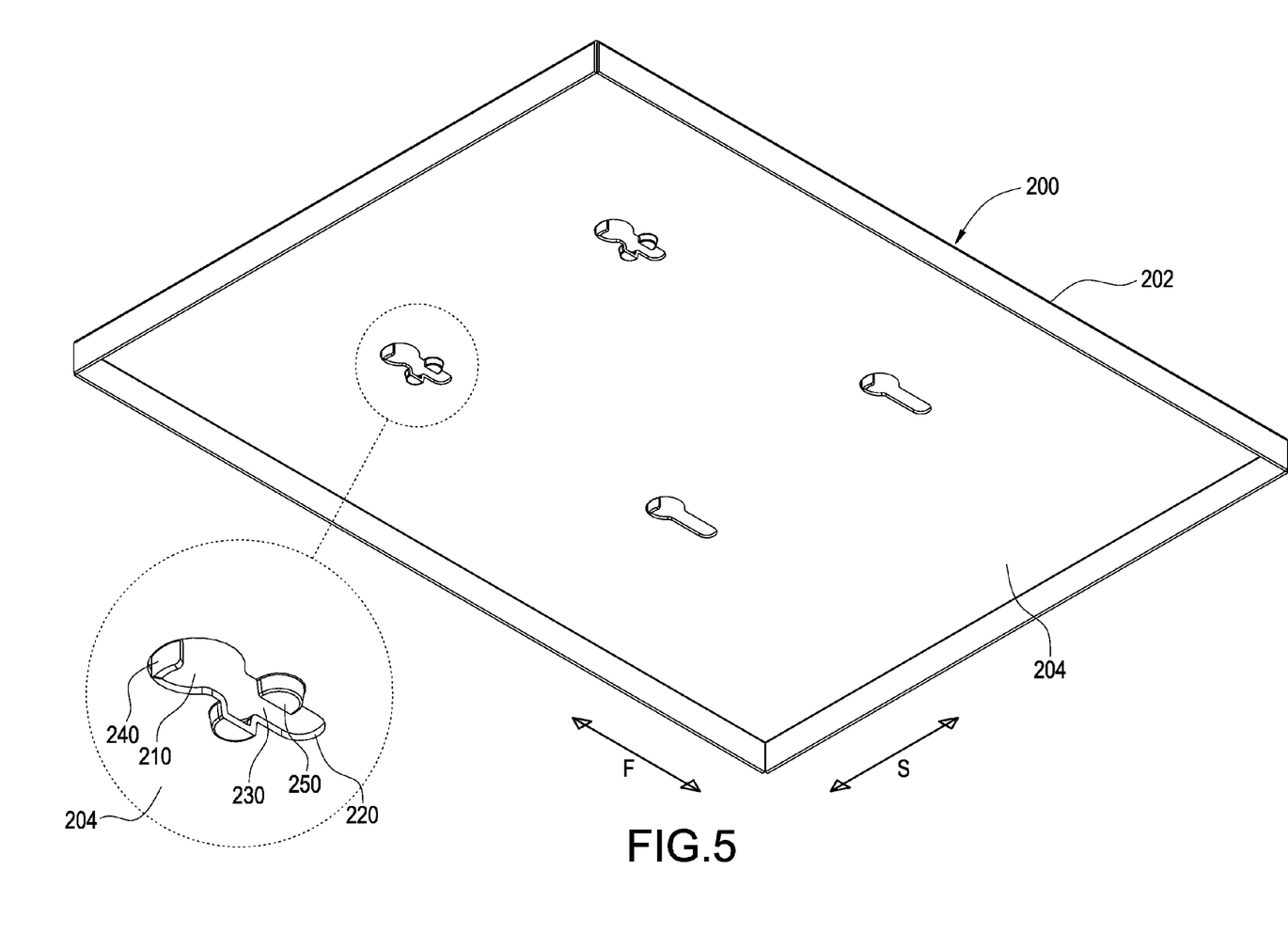
FIG. 5 is a partially enlarged view illustrating a second surface of the plate according to the present invention.
Figure 6:
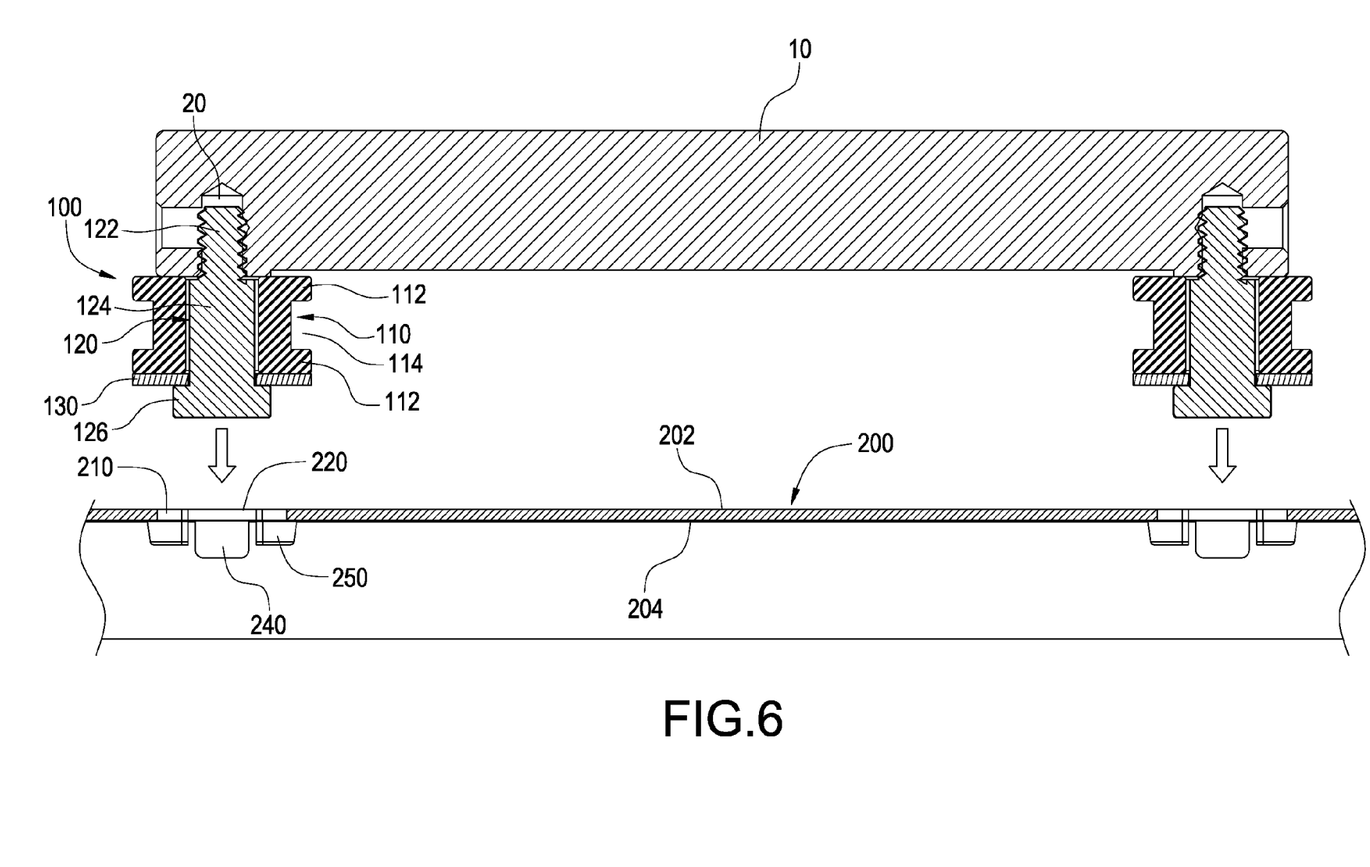
FIG. 6 is a cross-sectional view of the present invention, illustrating the fastening assembly assembled to the electronic device but yet to be assembled to the plate.
Figure 7A:
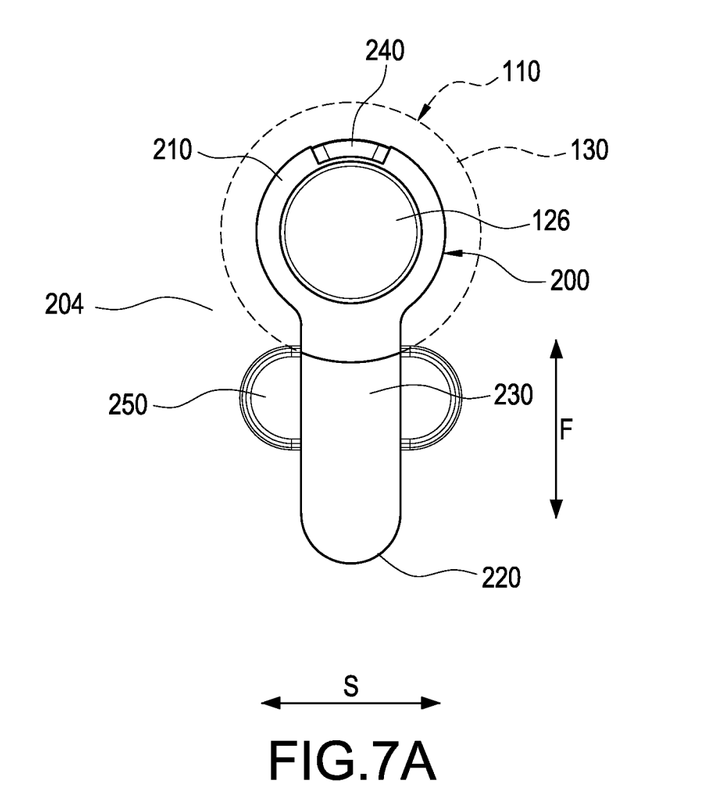
FIG. 7A is a bottom view of the present invention, illustrating a head portion of the fastening assembly disposed in a first positioning hole.
Figure 7B:
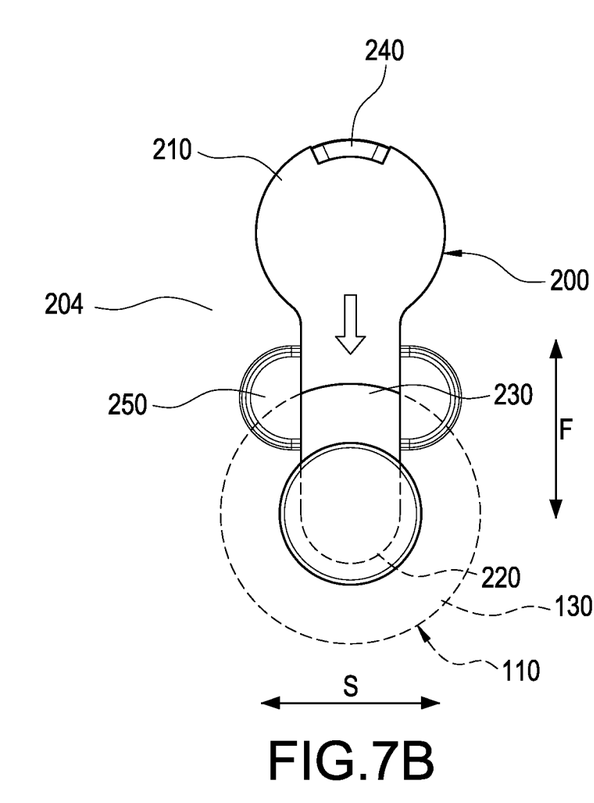
FIG. 7B is a bottom view of the present invention, illustrating a head portion of the fastening assembly assembled in a second positioning hole.

In the present embodiment, the plate 200 further includes a first surface 202, a second surface 204 opposite to the first surface 202, and an extension hole 230 passing through the first surface 202 and the second surface 204. As shown in FIGS. 5, 7A and 7B, the extension hole 230 is formed along the first direction F and between the first positioning hole 210 and the second positioning hole 220. A width of the extension hole 230 in the second direction S is equal to the diameter of the second positioning hole 220 in the second direction S, so that the extension hole 230 forms a straight groove flush with the outer diameter of the second positioning hole 220.

When the fastening assembly 100 is screwed into the assembly hole 20 of the electronic device 10, the buffer 110 can be a damper (vibration absorber) which is a material having elastic deformation capability, so as to prevent vibrations from being transmitted to the electronic device 10 via the fastening assembly 120 to affect operation performance. Furthermore, a length of the rod portion 124 between the head portion 126 and the fastening portion 122 is less than or equal to a height of the buffer 110, so as to facilitate elastic deformation of the buffer 110. In a preferable embodiment, when the head portion 126 of the fastening assembly 100 is assembled in the first positioning hole 210 of the plate 200 and is moved toward the second positioning hole 220 (i.e. along the first direction F), since the outer diameter of the head portion 126 is greater than the diameter of the second positioning hole 220, the head portion 126 can be engaged with the second positioning hole 220 in a direction perpendicular to the plate 200, and thereby the electronic device 10 is secured over the plate 200.

Figure 8:
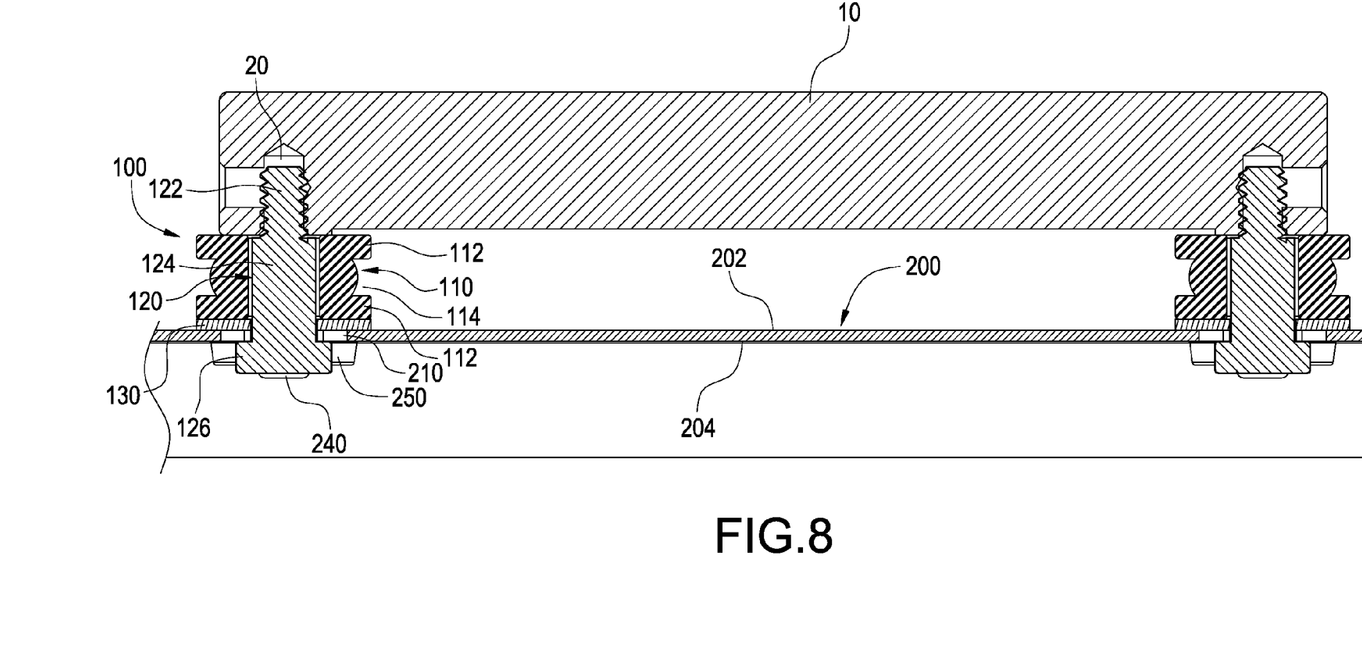
FIG. 8 is a cross-sectional view of the present invention, illustrating the head portion of the fastening assembly disposed in the first positioning hole.
Figure 9:
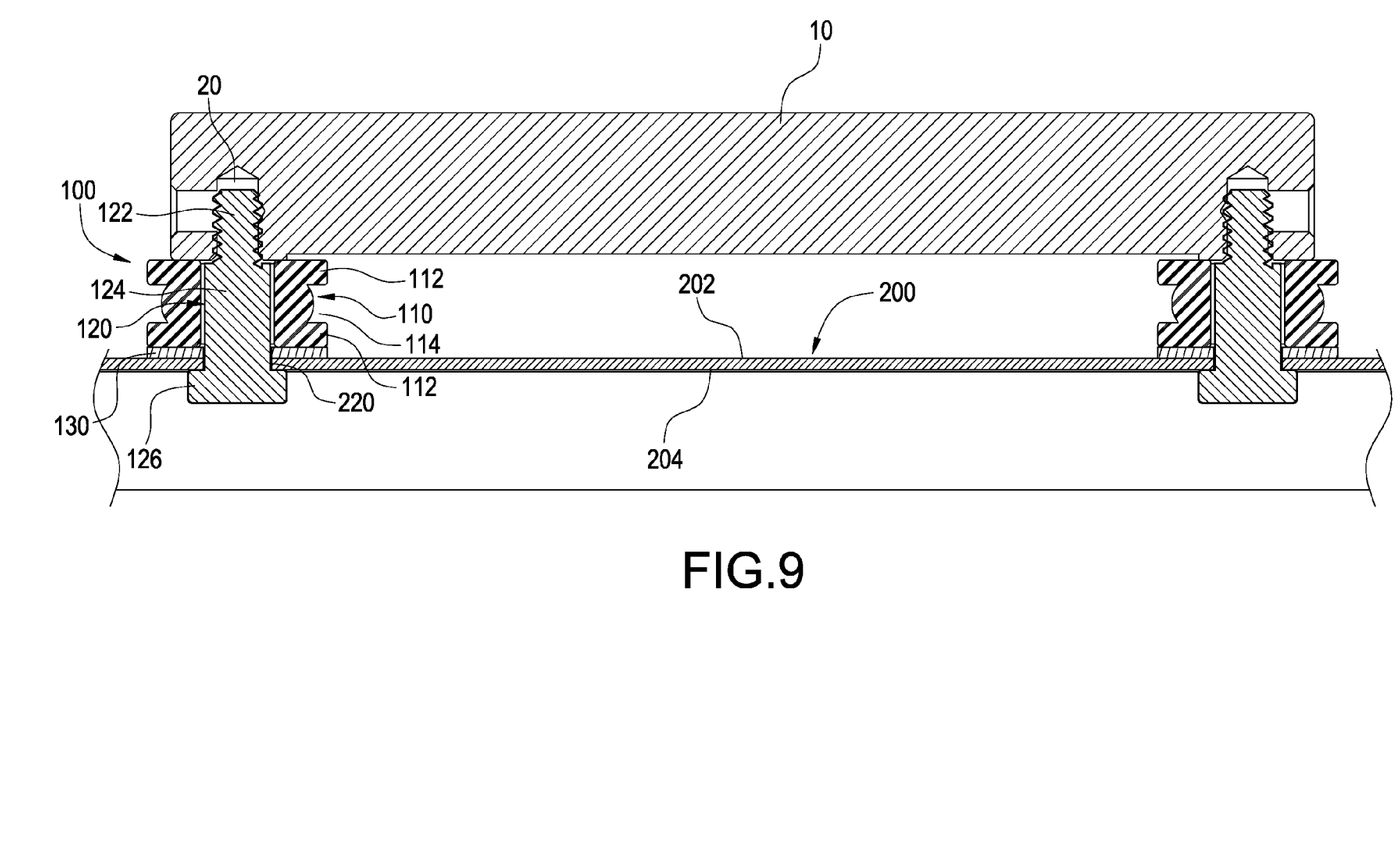
FIG. 9 is a cross-sectional view of the present invention, illustrating the head portion of the fastening assembly assembled in the second positioning hole.

In the embodiment shown in FIGS. 5 and 8, the fastening device further includes two protruding portions 250 protruding from the second surface 204. The buffer 110 (which is substantially a pad 130) is in contact against the first surface 202, and the head portion 126 and the two protruding portions 250 are disposed correspondingly so as to prevent removal of the head portion 126 from the second positioning hole 220 in a direction parallel to the plate 200.

Referring to FIGS. 7A, 7B and 8, it is preferable that the first positioning hole 210 and the second positioning hole 220 are each a round hole. The two protruding portions 250 are disposed adjacent to two sides of the extension hole 230, respectively, and are preferably in a curved shape or in a semi-circular shape, wherein the two protruding portions 250 protruding from the second surface 204 with a height less than a height of the head portion 126. In other words, when the head portion 126 of the fastening assembly 100 moves from the first positioning hole 210 to the second positioning hole 220 along the first direction F, the head portion 126 is obstructed by the two protruding portions 250, so a user can exert an adequate force on the electronic device 10 to enable elastic deformation of the buffer 110 and to make the head portion 126 move across the two protruding portions 250, thereby enabling fast securement to the second positioning hole 220. At this point, the fastening assembly 100 is also obstructed by the two protruding portions 250 and restricted in the second positioning hole 220, so the electronic device 10 is fully secured over the plate 200, as shown in FIG. 10.

Figure 10:
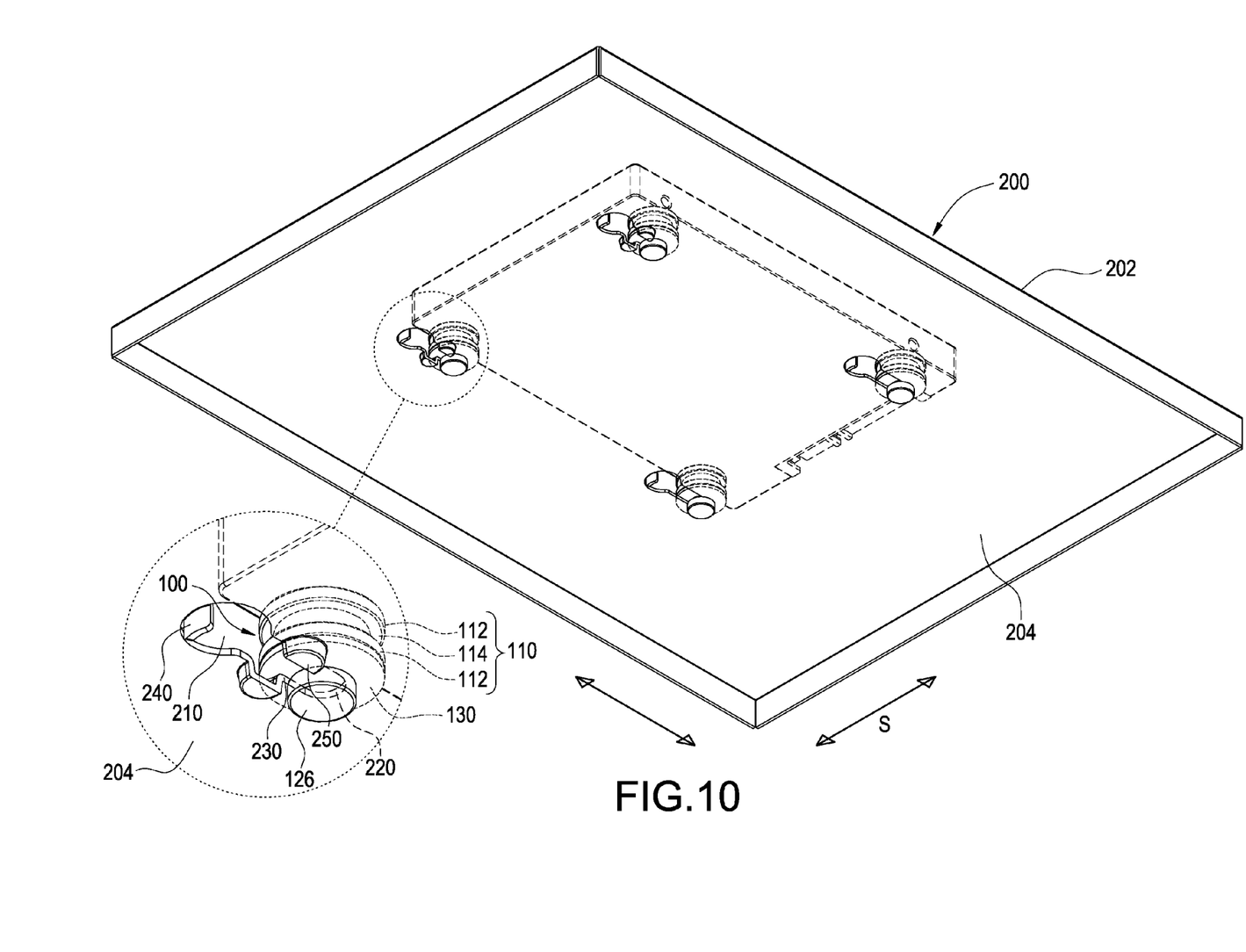
FIG. 10 is a perspective enlarged view from another viewing angle, illustrating the fastening device of the present invention.

In the embodiment shown in FIG. 10, the two protruding portions 250 can be selectively disposed around each of any two extension holes 230 of the plate 200 to enhance engagement strength, and the number of the pairs of the protruding portions is not limited. When necessary to replace the electronic device 10, the user can exert an adequate force to the electronic device 10 to enable elastic deformation of the buffer 110 and to make the head portion 126 move across the two protruding portions 250 along the first direction F, so that the head portion 126 is removed from the second positioning hole 220 to the first positioning hole 210, and consequently, the electronic device 10 can be released from the first positioning hole 210 and not restricted by the plate 200.

Finally, the plate 200 further includes a restriction plate 240. The restriction plate 240 protrudes from an edge of the first positioning hole 210 on the second surface 204, so as to prevent the head portion 126 from moving toward a direction opposite to the second positioning hole 220. Accordingly, the fastening assembly 100 of the present invention enables fast securement, provides shockproof protection, has a simple structure, and facilitates convenient assembly.

It is to be understood that the above descriptions are merely the preferable embodiment of the present invention and are not intended to limit the scope of the present invention. Equivalent changes and modifications made in the spirit of the present invention are regarded as falling within the scope of the present invention.

What is claimed is:

1. A fastening device for securing and protecting an electronic device, the electronic device being provided with at least one assembly hole, and the fastening device comprising:
   a fastening assembly, the fastening assembly comprising:
      a buffer; and
      a fastening element inserted through the buffer, the fastening element including a rod portion, a fastening portion at one end of the rod portion, and a head portion at the other end of the rod portion, wherein the fastening portion is fastenable in the assembly hole;
   a plate, including a first positioning hole and a second positioning hole communicating with the first positioning hole, wherein a diameter of the first positioning hole is greater than a diameter of the second positioning hole, and a diameter of the head portion is less than the diameter of the first positioning hole and greater than the diameter of the second positioning hole, so that the head portion is engaged with the second positioning hole, and the electronic device is secured over the plate,
   wherein the plate further includes a first surface, a second surface opposite to the first surface, and an extension hole passing through the first surface and the second surface, wherein a first direction is between the first positioning hole and the second positioning hole, and the extension hole is formed along the first direction and between the first positioning hole and the second positioning hole; and
   two pillar-shaped protruding portions protruding from the second surface and disposed at two sides of the extension hole, respectively, the buffer being in contact against the first surface, the head portion and the two pillar-shaped protruding portions being disposed correspondingly so as to prevent removal of the head portion from the second positioning hole.

2. The fastening device of claim 1, wherein the buffer further comprises two flanges, a recess between the two flanges, and a through hole for insertion of the rod portion, and a diameter of the through hole is greater than or equal to a diameter of the rod portion.

3. The fastening device of claim 2, wherein an outer diameter of each of the flanges is greater than the diameter of the head portion and the diameter of the first positioning hole, so that the buffer contacts against the plate corresponding to the first positioning hole and the second positioning hole.

4. The fastening device of claim 2, wherein a length of the rod portion between the head portion and the fastening portion is less than or equal to a height of the buffer, and the recess of the buffer is elastically deformable.

5. The fastening device of claim 1, wherein the fastening portion includes an external thread for fastening in the assembly hole, or the fastening portion is a plug for interference fit with the assembly hole.

6. The fastening device of claim 1, further comprising a pad, the pad being disposed between the buffer and the head portion.

7. The fastening device of claim 1, wherein a width of the extension hole in a second direction is equal to the diameter of the second positioning hole in the second direction, wherein the second direction is perpendicular to the first direction.

8. The fastening device of claim 7, wherein the diameter of the first positioning hole in the second direction is greater than the diameter of the second positioning hole in the second direction.

9. The fastening device of claim 1, wherein the first positioning hole and the second positioning hole are each a round hole, and the extension hole is a straight groove flush with the outer diameter of the second positioning hole.

10. The fastening device of claim 1, wherein the two pillar-shaped protruding portions are disposed adjacent to two sides of the extension hole, respectively, and the two protruding portions are in a curved shape or in a semicircular shape.

11. The fastening device of claim 1, wherein the two pillar-shaped protruding portions protrudes from the second surface with a height less than a height of the head portion.

12. The fastening device of claim 1, wherein the plate further includes a restriction plate, and the restriction plate extends out of an edge of the first positioning hole to protrude from the second surface, so as to prevent the head portion from moving toward a direction opposite to the second positioning hole.

13. The fastening device of claim 1, wherein the fastening element is a bolt, a positioning pillar, a dowel, or a pin.

14. The fastening device of claim 1, wherein the buffer is made of rubber or silicon, or consists of a spring.

* * * * *